United States Patent [19]

Larsen et al.

[11] Patent Number: 4,680,336

[45] Date of Patent: Jul. 14, 1987

[54] METHOD OF FORMING SHAPED HYDROGEL ARTICLES

[75] Inventors: Hans O. Larsen, Farum; Ture Kindt-Larsen, Vedbaek, both of Denmark

[73] Assignee: Vistakon, Inc., Jacksonville, Fla.

[21] Appl. No.: 703,009

[22] Filed: Feb. 19, 1985

Related U.S. Application Data

[63] Continuation-in-part of Ser. No. 673,805, Nov. 21, 1984.

[51] Int. Cl.$^4$ ............................................. B29D 11/00
[52] U.S. Cl. ............................................. 524/548; 264/1.4; 264/2.1; 264/2.6; 524/284; 524/555; 524/556; 524/577; 524/773; 524/776; 524/804; 524/808; 524/827; 524/832; 524/836; 524/916
[58] Field of Search ................ 264/1.4, 1.1, 2.6, 2.1; 523/106, 108; 524/284, 548, 555, 556, 577, 773, 776, 804, 808, 827, 832, 836, 916

[56] References Cited

U.S. PATENT DOCUMENTS

| Re. 27,401 | 6/1972 | Wichterle et al. | |
|---|---|---|---|
| 3,532,679 | 10/1970 | Steckler | 526/260 |
| 3,660,545 | 5/1972 | Wichterle et al. | |
| 3,699,089 | 10/1972 | Wichterle et al. | |
| 3,780,003 | 12/1973 | Seymour et al. | |
| 3,839,304 | 10/1974 | Horey | 523/108 |
| 3,876,581 | 4/1975 | Neogi | |
| 3,878,175 | 4/1975 | Steckler | 521/63 |
| 3,937,680 | 2/1976 | de Carle | 523/108 |
| 3,948,841 | 4/1976 | Dusek | |
| 3,963,685 | 6/1976 | Abrahams | 526/230 |
| 3,966,847 | 6/1976 | Seiderman | 525/262 |
| 3,992,563 | 11/1976 | Tanaka | 526/219 |
| 4,038,264 | 7/1977 | Rostoker | 526/286 |
| 4,158,089 | 6/1979 | Loshaek et al. | 526/264 |
| 4,163,092 | 7/1979 | Steckler | 526/292 |
| 4,182,822 | 1/1980 | Chang | 526/264 |
| 4,347,198 | 8/1982 | Ohkada et al. | |
| 4,361,657 | 11/1982 | Atkinson | 523/106 |
| 4,495,313 | 1/1985 | Larsen | 523/106 |

FOREIGN PATENT DOCUMENTS

1478455 6/1977 United Kingdom .
2097805 11/1982 United Kingdom .

OTHER PUBLICATIONS

CRC Handbook of Solubility Parameters and Other Cohesion Parameters, A. F. M. Barton, CRC Press Inc. (1983), pp. 85–87; 141–148; 153–164; 279; 289; 290–291; 477.
The Universality of the Solubility Parameter, C. M. Hanson, I & EC Product Research and Development, 1966, 8, 2–11.
Stereographic Display of Three-Dimensional Solubility Parameter Correlations, Ind. Eng. Chem. Prod. Res. Dev., 1984, 23, 240–245.

Primary Examiner—James Lowe
Attorney, Agent, or Firm—Wayne R. Eberhardt

[57] ABSTRACT

A method for forming shaped hydrogel articles such as soft contact lenses wherein hydrophilic monomers are mixed with an inert diluent prior to polymerization, and the diluent is replaced with water following the polymerization. Diluents yielding optically clear hydrogels with good mechanical properties are selected on the basis of their viscosity and their Hanson cohesion parameters relative to the cohesion parameters of the polymeric component of the hydrogel.

23 Claims, 2 Drawing Figures

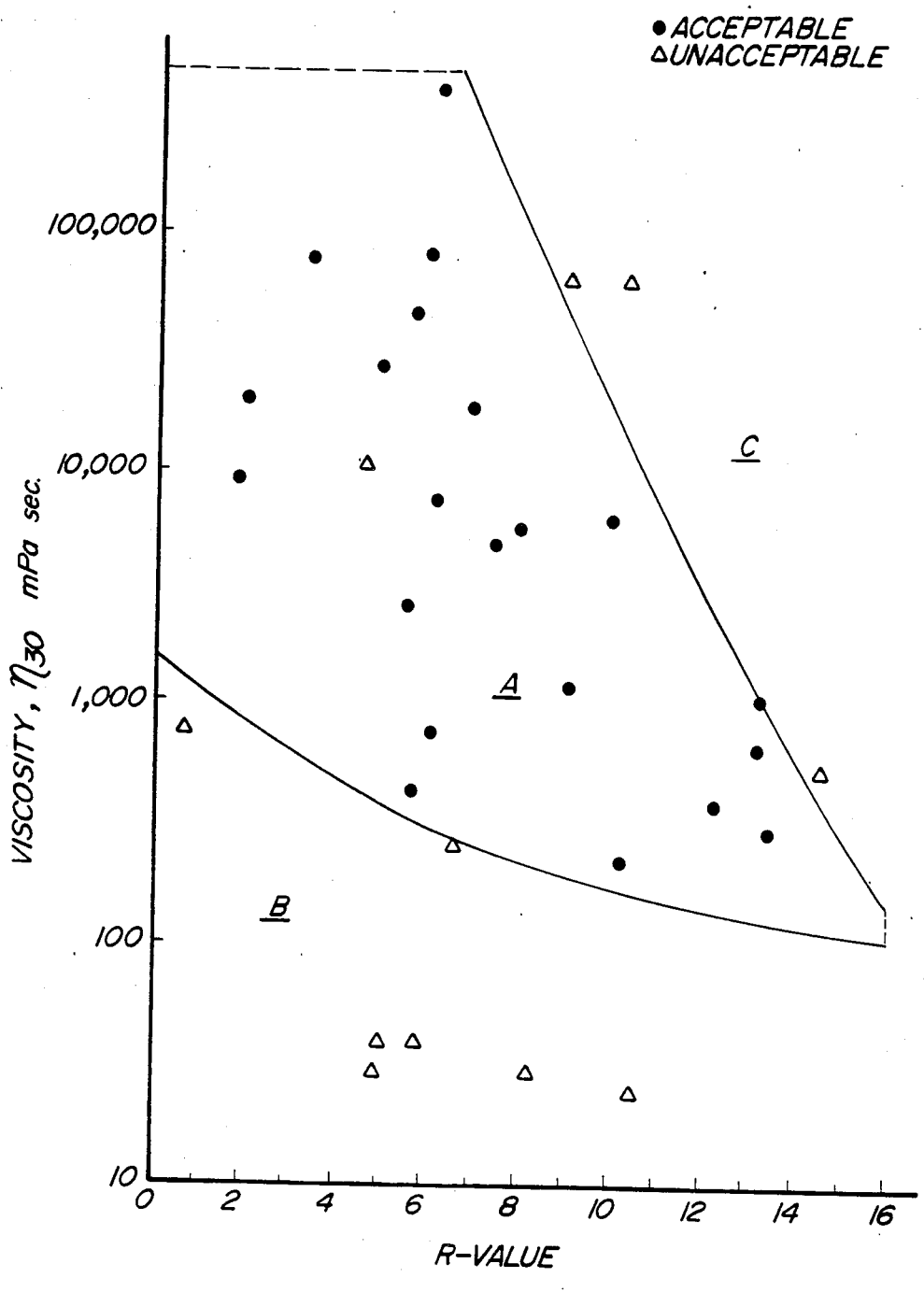

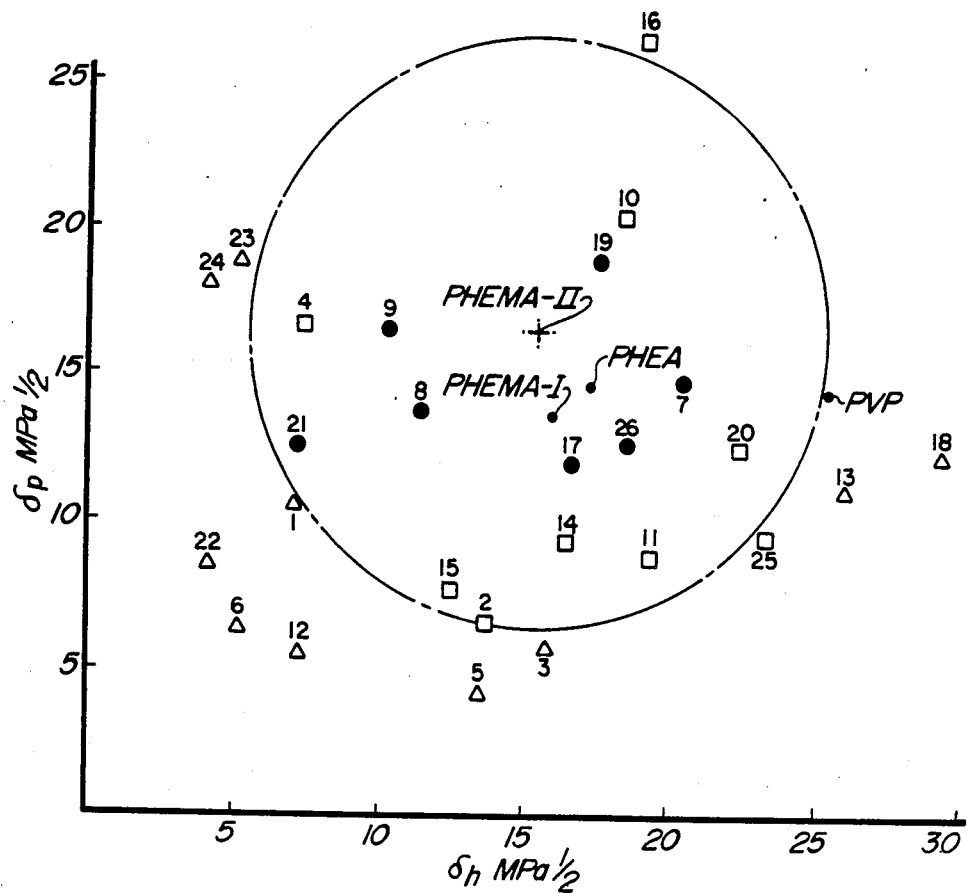

METHOD OF FORMING SHAPED HYDROGEL ARTICLES

This application is a continuation-in-part of application Ser. No. 673,805, filed Nov. 21, 1984.

FIELD OF INVENTION

This invention relates to soft contact lenses of the hydrogel type, and more particularly, to a method for the manufacture of such contact lenses by polymerizing a mixture of hydrophilic monomers and an inert diluent in a lens mold, and thereafter replacing the diluent with water.

BACKGROUND OF INVENTION

Soft contact lens of the hydrogel type have traditionally been manufactured either by lathe cutting or spin casting. In the lathe cutting method, a lens blank or button of a substantially anhydrous hydrophilic polymer (xerogel) is mechanically cut and polished to a lens shape on a fine lathe, and thereafter contacted with water or saline to hydrate the polymer and form the desired hydrogel lens. The mechanics of the lathe cutting process are similar to those utilized in the manufacture of conventional hard contact lenses, except that allowance must be made for swelling of the lens during hydration of the polymer.

In the spin casting method, a small quantity of hydrophilic monomer is placed in a concave, optically polished mold, and the mold rotated while the monomers are polymerized to obtain a xerogel lens. The two optical surfaces of the lens are formed simultaneously during polymerization, the outer surface being shaped by the concave mold surface, and the inner surface being shaped by the joint actions of centrifugal force generated by the rotating mold and surface tension of the polymerization mixture. The lens produced thereby is contacted with water or saline to hydrate the polymer and form a hydrogel lens as in the case of the lathe cut lens.

The manufacture of soft hydrogel lenses by either lathe cutting or spin casting presents a problem in that when the hydrophilic lens is hydrated, considerable expansion of the lens takes place, and the degree of expansion is not always constant or predictable from lens to lens. In the case of lathe cut lens, variable stresses in the xerogel polymer button may cause differences in the optical properties of the final hydrogel lens. In the case of spin casting, lens properties tend to be more uniform but variability may be introduced by differences in polymerization rate or conditions.

To avoid the difficulties experienced when hydrating a lens initially formed as anhydrous, hydrophilic xerogel, attempts have been made with varying degrees of success to prepare lenses directly in the expanded gel state. Efforts in this direction have generally not been successful in producing high quality hydrogel contact lens and the method has not addopted commercially.

U.S. Pat. No. 3,220,960 (Re. 27,401) suggests direct molding of hydrogel contact lenses by copolymerizing a hydrophilic monomer in aqueous solution with a cross-linking agent to yield an elastic, soft, transparent hydrogel lens. Suitable hydrophilic monomers include esters of acrylic acid and methacrylic acid with alcohols having hydrophilic groups.

U.S. Pat. No. 3,660,545 discloses spin casting soft contact lenses by polymerizing a mixture of a hydrophilic monomer with water or a water miscible solvent. Organic solvents readily soluble in water such as a water soluble lower aliphatic alcohol, or a polyvalent alcohol such as glycol, glycerol, dioxane and the like, are disclosed to be suitable solvents. Solvent content of the polymerization mixture is recommended to be between 5% and 50%, and preferably between 15 and 40% by weight. Solvent content is established to assure that the polymerization mixture will constitute a single phase throughout the polymerization, and that the polymerized lens will still swell appreciably when the solvent is replaced with water.

U.S. Pat. No. 3,699,089 discloses spin casting soft contact lenses by polymerizing hydrophilic monomers in the presence of a water miscible solvent under substantially anhydrous conditions. Suggested solvents are ethylene glycol, glycerol, formamide, dimethylformamide, dimethylsulfoxide, the glycol esters of lactic acid and the liquid polyethylene glycols. The solvent content of the polymerization mixture is recommended to substantially exceed the final equilibrium water level of the hydrogel so that the cast lens shrinks when the solvent is displaced with water.

U.S. Pat. No. 3,780,003 relates to polymers of alkoxy and hydroxy alkyl acrylates or methacrylates and, while not specifically concerned with the manufacture of contact lenses, discloses in Example II the preparation of a transparent, cross-linked gel by polymerizing a mixture of HEMA and EEMA with 40% by volume tetrahydrofuran.

U.S. Pat. No. 4,347,198 discloses a method for static casting or molding contact lenses by polymerizing a mixture of hydrophilic and hydrophobic monomers with from 5% to 95% by weight of a solvent. The solvent is characterized as being one that does not obstruct the polymerization reaction or post cross-linking reaction, and which preferably results in a transparent polymerization product. Where the monomers are N-vinyl pyrrolidone and methyl methacrylate, the solvent is preferably dimethyl sulfoxide and/or ethylene carbonate, optionally with a small amount of dioxane. Other suggested solvents include dimethylformamide, N-methyl pyrrolidone, dimethyl acetamide, and a mixture of ethylene glycol and water.

U.K. Patent Application G.B. No. 2,097,805 discloses a method for static casting or molding soft contact lenses by polymerizing a substantially anhydrous polymerization mixture of acrylic or methacrylic monomers with a water displaceable ester formed of boric acid and a compound containing 3 or more hydroxyl groups. The amount of the boric acid ester diluent in the polymerization mixture is preferably controlled so that the diluent is displaced substantially on a 1:1 basis and lens size and shape is not significantly altered during displacement of the ester with water.

It is apparent from the disclosures of the above patent references that suitable solvents or diluents for specific polymerization systems have been selected on the basis of trial and error in an effort to identify those materials which will not interfere with the polymerization reaction, can be readily displaced with water following polymerization, and yield a hydrogel contact lens which is optically clear and has good mechanical properties.

We have found that, with the exception of the boric acid ester, the solvents or diluents suggested in the prior art for use in the polymerization of hydrophilic monomers do not yield HEMA based hydrogel contact lenses having the aforesaid desirable optical and mechanical properties. Many of these prior art diluents result in lenses which are cloudy or hazy, near opaque or actually white. Other materials yield lenses which are optically clear but lacking in mechanical properties as indicated by a low modulus of the final hydrogel lens.

The boric acid ester diluent of G.B. No. 2,097,805 can yield a HEMA based hydrogel contact lens with good optical and mechanical properties, but some difficulties may be experienced in molding lenses of relatively thick cross section, i.e., in excess of 1 mm, where displacement of the diluent with water does not occur as rapidly as in the case of a thinner cross section. When the molded lens containing the boric acid ester diluent is placed in water or saline for replacement of the diluent with water, the boric acid ester quickly hydrolyzes to the polyhydric alcohol and boric acid. If the flux of water is high, such as in the case of a very thin contact lens in agitated water, the boric acid will be kept in solution during the replacement process. If on the other hand, the flux of water is low, such as in the case of a lens of thicker cross section and/or in static water, the boric acid may crystallize as sharp needles inside the hydrogel lens with an adverse affect on both mechanical and optical properties.

It is accordingly an object of the present invention to provide a method for selecting suitable diluents for various hydrophilic polymer compositions used in the manufacture of soft hydrogel contact lenses. It is a further object of this invention to define various polymerization systems which include a diluent and are suitable for the preparation of soft hydrogel contact lenses. A yet further object of this invention is to define the parameters of desirable diluents useful in the preparation of soft HEMA based hydrogel contact lenses having desirable optical and mechanical properties. These and other objects of the invention will be apparent from the ensuing description and claims.

SUMMARY

Hydrogel articles such as soft hydrophilic contact lenses are prepared by molding or casting a polymerization mixture comprising one or more hydrophilic monomers, a crosslinking agent, and from about 20 to 95% by weight of a diluent which is a water displaceable organic composition having a viscosity and R-value falling within Area A of FIG. I, said viscosity being from about 100 to 500,000 M Pa sec at 30° C., and said R-value being from 0 to about 16 as determined by Hansen's cohesion parameters for the diluent and the polymer according to the following equation:

$$R = [(\delta_{p1} - \delta_{p2})^2 + (\delta_{h1} - \delta_{h2})^2]^{0.5}$$

wherein $\delta_{p1}$ and $\delta_{h1}$ respectively are the Hansen polar and hydrogen-bonding cohesion parameters for the polymeric component of the hydrogel article, and $\delta_{p2}$ and $\delta_{h2}$ are the corresponding parameters for the diluent. R-value is accordingly a measure of the distance between the loci of the parameters $\delta_p$ and $\delta_h$ for the diluent and for the polymeric component of the lens.

The hydrophilic monomers include the hydroxyacrylates such as hydroxyethylacrylate and hydroxyethylmethacrylate, the N-vinyl lactams such as N-vinyl pyrrolidone and mixtures thereof. The polymerization mixture may additionally contain one or more other hydrophilic or hydrophobic monomers to impart desired physical properties to the product such as methylmethacrylate, methacrylic acid, styrene and the like.

Diluents having a viscosity and R-value within Area A of FIG. I yield hydrogel lenses having good optical and mechanical properties. Diluents having viscosity and R-values which fall outside Area A of FIG. I may be expected to yield lenses having poor optical and/or mechanical properties. Specifically, diluents which fall within Area B of FIG. I are characterized by generally undesirably low physical strength. Diluents which fall within Area C of FIG. I typically have poor optical clarity which may vary from hazy to white.

Lenses are prepared with diluents selected according to the present invention using static or spin casting methods known in the art and previously used with other diluents as disclosed for example in G.B. No. 2,097,805 and U.S. Pat. No. 3,660,545, which references are incorporated herein by reference for their teaching of manufacturing methods.

DESCRIPTION OF DRAWINGS

FIG. I is a semilog plot of diluent viscosity and R-value, showing within the enclosed Area A the diluents which produce acceptable hydrogel contact lenses.

FIG. II is a plot of the Hansen cohesion parameters $p$ and $h$ for several solvents indicating the extent to which PHEMA polymer swells in each solvent, from which data the corresponding cohesion parameters of the polymer are determined.

DESCRIPTION OF PREFERRED EMBODIMENTS

The terms "hydrogel" and "hydrogel polymer" as used herein refer to water insoluble hydrophilic polymer compositions which contain imbibed water in an amount ranging generally from about 20% to about 95% by weight of the composition.

The term "hydrophilic monomer" as used herein refers to a monomer which, when polymerized, yields an anhydrous hydrophilic polymer or xerogel which is capable of forming a hydrogel when exposed to water. Preferred among such monomers are the hydroxyacrylates which have found wide acceptance in the preparation of soft contact lenses.

Specific hydroxyacrylate monomers which may be utilized to form hydrophilic hydrogel polymer compositions are those of the formula

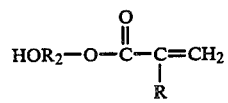

wherein R is hydrogen or methyl, most preferably methyl, and $R_2$ is an alkylene of 2 to 4 carbon atoms, most preferable 2 carbon atoms. The most preferable hydroxyacrylate monomer and most commonly used in the preparation of soft hydrogel contact lenses is hydroxyethyl methacrylate (HEMA). Other such monomers include hydroxyethyl acrylate (HEA), hydroxypropyl methacrylate, hydroxypropyl acrylate and hydroxytrimethylene acrylate.

The hydroxyacrylate monomers are generally copolymerized with a minor amount of one or more other monomers which may be either hydrophilic or hydrophobic and are selected to impart specific chemical or physical properties to the resulting hydrogel copolymer. Included among such comonomers as disclosed in the prior art are isobutyl methacrylate, methacrylic acid, styrene, ethoxyethylmethacrylate, vinyl acetate, methyl methacrylate, N-vinyl pyrrolidone, methoxytriethyleneglycal methacrylate, hydroxyethyl acrylate, hydroxytrimethylene acrylate and methoxyethylmethacrylate. Alternatively, the major hydrophilic monomer component may be an N-vinyl lactam, preferably N-vinyl pyrrolidone, while the minor component is a hydroxy acrylate monomer, preferably HEMA, and/or one or more of the other above enumerated comonomers.

Specific base polymer formulations for representative hydrophilic compositions, i.e., formulations of primary monomers not including cross-linking agents, catalysts or polymerization initiators, and the water content of the resulting product, are presented in Table I along with the reference source disclosing the polymer composition and its use in the preparation of soft hydrogel contact lenses.

TABLE I

| Base Polymer Composition | % Water | Reference |
|---|---|---|
| A. 58–96% HEMA<br>4–30% Styrene<br>0–12% Methacrylic acid | 25–70% | U.S. Pat. No. 4,361,657 |
| B. 40–75% HEMA<br>25–60% Methoxytriethyleneglycol methacrylate | 40–60% | U.S. Pat. No. 4,038,264 |
| C. 70–75% HEMA<br>25–30% Acrylamide | 58–62% | U.S. Pat. No. 4,038,264 |
| D. 55–80% HEMA<br>20–45% N—vinyl-2-pyrrolidone<br>0–1.2% Methacrylic acid | 50–62% | U.S. Pat. No. 3,839,304 |
| E. 60–90% N—vinyl-2-pyrrolidone<br>10–40% HEMA | 80–95% | U.S. Pat. No. 3,532,679 |
| F. 42–70% HEMA<br>30–50% N—vinyl-2-pyrrolidone<br>0.25–5.6% Methacrylic acid | 55–85% | U.S. Pat. No. 3,937,680 |
| G. 93–99.4% HEMA<br>0.6–7.0% p-Nitrophenyl 166 acrylate | 35–40% | U.S. Pat. No. 4,450,262 |
| H. 73% HEMA<br>27% Hydroxyethyl acrylate | 43% (calc) | GB 2,099,805 |
| I. 87% Hydroxyethyl acrylate<br>13% Vinyl acetate | 78% (calc) | GB 2,097,805 |
| J. 90% HEMA<br>10% Methyl methacrylate | 36% (calc) | GB 2,097,805 |
| K. 50% HEMA<br>50% 2-Ethoxyethyl methacrylate | 40% (calc) | U.S. Pat. No. 3,780,003 |

The hydrophilic polymers are preferably lightly cross-linked to form a three dimensional network. A small amount of a cross-linking agent, usually from 0.05 to 2% and most frequently from 0.05 to 1.0%, of a diester or triester, is included in the polymerization mixture. Examples of representative cross linking agents include: ethylene glycol diacrylate, ethylene glycol dimethacrylate, 1,2-butylene dimethacrylate, 1,3-butylene dimethacrylate, 1,4-butylene dimethacrylate, propylene glycol diacrylate, propylene glycol dimethacrylate, diethylene glycol dimethacrylate, dipropylene glycol dimethacrylate, diethylene glycol diacrylate, dipropylene glycol diacrylate, glycerine trimethacrylate, trimethylol propane triacrylate, trimethylol propane trimethacrylate, and the like. Typical cross-linking agents usually, but not necesarily, have at least two ethylenically unsaturated double bonds.

The polymerization reaction generally also includes a catalyst, usually from about 0.05 to 1 percent of a free radical catalyst. Typical examples of such catalysts include lauroyl peroxide, benzoyl peroxide, isopropyl percarbonate, azobisisobutyronitrile and known redox systems such as the ammonium persulfate-sodium metabisulfite combination and the like. Irradiation by ultraviolet light, electron beam or a radioactive source may also be employed to catalyze the polymerization reaction, optionally with the addition of a polymerization initiator.

The polymerization is carried out in admixture with an inert, water displaceable diluent, and in a suitable lens mold so that the product of the polymerization is a shaped, polymeric gel containing the diluent within the interstices of the polymeric network. This method of polymerization is described in detail in G.B. No. 2,097,805 in connection with the use of a boric acid ester diluent. The diluents of the present invention do not form crystalline compounds during the replacement of the diluent with water even if the flux of water is low as in the case of the boric acid ester diluent. If the diluent is of limited water solubility, it may be necessary to first replace the diluent with a water-soluble solvent such as ethanol, and thereafter replace the ethanol with water. The need for such an intermediate washing step is easily discerned for any given diluent composition.

In accordance with the present invention, the diluent for use in the polymerization reaction is selected for any given polymer composition on the basis of the Hansen solubility parameter for that polymer. Hansen's solubility parameter $\delta$ is usually expressed in terms of three components ($\delta_h, \delta_p, \delta_d$) where $\delta_h$ is the hydrogen bonding cohesion parameter, $\delta_p$ is the polar cohesion parameter, and $\delta_d$ is the dispersion cohesion parameter. We have found, however, that for purposes of the present invention, $\delta_d$ of the diluents is substantially constant, and so this parameter has little effect in determining the suitability of any particular diluent for any specific polymer system. The consideration of the Hansen cohesion parameters for the diluent may accordingly be reduced to a two dimensional function on the basis of $\delta_p$ and $\delta_h$, greatly simplifying the diluent characterization process.

The Hansen solubility parameter, and the individual cohesion parameters, for any given polymer composition may be determined theoretically by the group contribution method, or experimentally by determining the extent of polymer solubility or swelling in a number of solvents for which the cohesion parameters are known. The experimental method is considered to be more accurate and is accordingly preferred. An example of this method in determining the solubility parameter for two cellulose acetate polymers in three dimensions ($\delta_d, \delta_p, \delta_h$) is given at p.243 in Ind. Eng. Chem. Prod. Res. Dev., Vol. 23, No. 2, 1984, pp.240–245. The cohesion parameters for a large number of common solvents which may be used in the experimental method are published in Tables 5 and 6, pp.153–161 of the CRC Handbook of Solubility Parameters and Other Cohesion Parameters, Allan F. Barton, CRC Press Inc., 1983 (CRC Handbook). Reference should be made to the text of the CRC Handbook for guidance in determining the solubility and cohesion parameters for any given polymer composition by the group contribution method.

Using the experimental method, the Hansen cohesion parameters ($\delta_p, \delta_h, \delta_d$), for a polymer comprising lightly cross-linked 98% HEMA and 2% MAA (methacrylic acid) were determined to be 16.2, 15.3, 16.6. The extent to which the polymer swelled in twenty-six solvents having known cohesion parameters was determined, and the center of the solubility region which indicates the solubility parameter for the polymer was established on the basis of a spherical contour by computer resolution. A less precise and more difficult determination of the center of the solubility region can also be made visually with the aid of a three-dimensional model of the data.

A two-dimensional plot of the solubility of the HEMA/MAA polymer according to the cohesion parameters $\delta_p$ and $\delta_h$ of the solvent is presented in FIG. II. Since the $\delta_d$ parameter of the solvents did not vary appreciably, the center of the circle in FIG. II provides a good approximation of the center of the spherical contour generated by the three-dimensional data. The solvents corresponding to the numbered data points in FIG. II are identified in Table II.

TABLE II

| | Solvents of FIG. II | | |
|---|---|---|---|
| No. | Solvent | No. | Solvent |
| 1 | Acetone | 14 | Ethylene glycol monomethylether |
| 2 | Benzylalcohol | 15 | Ethyl lactate |
| 3 | 1-Butanol | 16 | Formamide |
| 4 | δ-Butyrolactone | 17 | Formic acid |
| 5 | Cyclohexanol | 18 | Glycerol |
| 6 | Cyclohexanone | 19 | Hydracrylonitrile |
| 7 | Diethylene glycol | 20 | Methanol |
| 8 | Dimethylformamide | 21 | N—methyl-2-pyrrolidone |
| 9 | Dimethylsulfoxide | 22 | Nitrobenzene |
| 10 | Dipropylene glycol | 23 | Nitromethane |
| 11 | Ethanol | 24 | Propylene carbonate |
| 12 | Ethylacetate | 25 | Propylene glycol |
| 13 | Ethylene glycol | 26 | Triethylene glycol |

The Hansen cohesion parameters of PHEMA and other hydrophilic polymer compositiosn were determined to be as follows:

| POLYMER | $\delta_d$ | $\delta_p$ | $\delta_h$ |
|---|---|---|---|
| PHEMA - (exp) | 16.6 | 16.2 | 15.3 |
| - (calc) | 18.6 | 13.5 | 16.1 |
| PHEA - (calc) | 16.9 | 14.5 | 17.4 |
| PVP - (exp) | 20.6 | 14.4 | 25.5 |

The parameters for PVP were computed from swelling data reported in The Universality of the Solubility Parameter, I. and E.C. Product Research and Development, C. M. Hansen, Vol. 8, pp 1-6 (1969). The data for PHEA were calculated by the group contribution method using the group values given on pp.85-87 of the CRC Handbook. The data for PHEMA were also calculated by the group contribution method for comparison to the results obtained experimentally by the solvent swelling method as described above. Calculated values are considered to be an approximation of the more accurate values determined experimentally.

The $\delta_p$, $\delta_h$ coordinates for the above polymer compositions are included in FIG. II for purposes of illustrating the location of each polymer relative to PHEMA as determined experimentally. Compositions comprising a copolymer of HEMA with one or more other monomers will have a cohesion parameters equal to the weighted average of the individual cohesion parameters of the polymeric components. In the case of a HEMA/HEA copolymer, the parameters $\delta_p$ and $\delta_h$ of the individual polymers are relatively close as illustrated in FIG. II, and diluents acceptable for PHEMA are expected to be acceptable for PHEA and for copolymers of HEMA/HEA in all ratios. In the case of copolymers of HEMA and N-vinyl pyrrolidone, however, the higher $\delta_h$ value of PVP indicates the diluents having correspondingly higher $\delta_h$ values will be preferred for copolymers containing more than about 20% N-vinyl pyrrolidone.

FIG. I is a plot of the results obtained in the preparation of hydrogel contact lenses by polymerizing the aforesaid 98/2 HEMA/MAA monomer formulation with a number of diluents having a range of cohesion parameters. The monomer/diluent mixtures were cast into lenses using the general procedures and molds described in G.B. No. 2,097,805. Since the polymer composition was determined to hydrate to about 58% water, the casting solutions were made up with 60% by volume diluent. Thus, when the diluent was exchanged with water, there was only sliqht shrinkage in the physical dimensions of the cast lens.

The polymerization mixture comprising the monomers, 0.4% ethylene glycol dimethacrylate cross-linking agent, the diluent and a small amount of photoinitiator was placed into a concave lens mold, and a convex lid put in place to define a mold cavity in the shape of a plano lens filled with the polymerization mixture. The molds were fabricated of clear polystyrene, and the polymerization was initiated by exposing the assembled mold to UV light for a period of 10 minutes.

After polymerization was completed, the molds were immersed in warm water and allowed to soak for about 20 minutes, after which time sufficient water had penetrated into the mold and polymeric gel to allow the lid portion of the mold to be removed and the polymer gel separated from the mold cavity. The lens was thoroughly washed with 2 to 3 rinses of demineralized water as necessary to remove the diluent, then soaked in 0.9% NaCl normal saline for about 2 hours. The finished lens was visually graded for optical clarity, and if found acceptable, tested for physical strength.

Referring now to Table III, there are listed twenty-one diluent compositions which yielded optically clear lenses having an acceptable modulus (E) of 0.12 M Pa or greater. The cohesion parameters $\delta_p$ and $\delta_h$ for diluents not listed in the CRC Handbook were determined using the group contribution method as described in the CRC Handbook. The R-value for each diluent was calculated on the basis of a polymer $\delta_p$ and $\delta_h$ of 16.2 and 15.3 respectively as determined experimentally for the PHEMA polymer.

TABLE III

| No. | Diluent | $\delta_p$ | $\delta_h$ | R | $\eta_{30}$ m Pa sec | E M Pa |
|---|---|---|---|---|---|---|
| 1. | Succinic Acid/Glycerol Ester (1:1.5) | 10.9 | 19.9 | 7.0 | 18,200 | 0.25 |
| 2. | No. 1/Glycerol (1:2) | 11.2 | 21.5 | 8.0 | 5,700 | 0.25 |
| 3. | Citric Acid/Propylene Glycol Ester (1:1.1) | 10.3 | 16.5 | 6.0 | 80,000 | 0.24 |
| 4. | Phthalic Anhydride/Glycerol Ester (1:2) | 12.6 | 20.3 | 6.2 | 7,600 | 0.18 |
| 5. | Hexane-1,2,6-triol | 10.0 | 22.0 | 9.1 | 1,200 | 0.12 |
| 6. | No. 5/Glycerol (1:3) | 11.7 | 27.7 | 13.2 | 670 | 0.22 |
| 7. | Glycerol/Propylene Glycol (3:1) | 11.5 | 28.0 | 13.5 | 300 | 0.19 |
| 8. | Tartaric Acid/Propylene Glycol Ester (1:1) | 13.4 | 20.8 | 6.2 | 400,000 | 0.25 |

TABLE III-continued

| No. | Diluent | $\delta_p$ | $\delta_h$ | R | $\eta_{30}$ m Pa sec | E M Pa |
|---|---|---|---|---|---|---|
| 9. | No. 8/Triethyleneglycol (3:1) | 13.3 | 20.2 | 5.7 | 45,000 | 0.25 |
| 10. | No. 8/No. 19 (3:5) | 12.8 | 18.9 | 5.0 | 27,000 | 0.16 |
| 11. | Adipic Acid/Glycerol Ester (3:4) | 9.5 | 18.6 | 7.5 | 4,600 | 0.24 |
| 12. | Phthalic Anhydride/1,3 Butane Diol Ester (1:1.2) | 11.1 | 12.9 | 5.6 | 2,600 | 0.16 |
| 13. | No. 12/Dimethoxyethylphthalate (3:1) | 11.3 | 11.7 | 6.1 | 760 | 0.21 |
| 14. | Diglycerol | 13.7 | 25.0 | 10.0 | 6,200 | 0.24 |
| 15. | PROPYLAN G310* | 10.4 | 16.1 | 5.8 | 430 | 0.15 |
| 16. | Glycerol Monoacetate/Glycerol (1:1) | 11.2 | 24.3 | 10.3 | 223 | 0.16 |
| 17. | Glycerol Monoacetate/Glycerol (1:3) | 11.7 | 26.8 | 12.3 | 380 | 0.20 |
| 18. | Glycerol/Trimethylolpropane (3:1) | 11.7 | 27.7 | 13.2 | 1,000 | 0.22 |
| 19. | No. 8/Propylenecarbonate (3:1) | 14.5 | 16.5 | 2.0 | 18,000 | 0.21 |
| 20. | No. 8/Propylenecarbonate/Dipropyleneglycol (6:1:1) | 15.0 | 18.4 | 3.3 | 79,000 | 0.22 |
| 21. | No. 8/Propylenecarbonate/Dipropyleneglycol (4:1:1) | 15.7 | 17.2 | 1.9 | 9,500 | 0.18 |

*Trademark Lankro Chemicals, Ltd., England, for a propoxylated glycerol.

TABLE IV

| No. | Diluent | $\delta_p$ | $\delta_h$ | R | $\eta_{30}$ m Pa sec | E M Pa | Lens Appearance |
|---|---|---|---|---|---|---|---|
| 22. | Lactic Acid/Glycerol Ester (4:1) | 12.2 | 17.8 | 4.7 | 10,800 | 0.09 | Clear |
| 23. | Citric Acid/Glycerol Ester (1:2) | 12.8 | 23.6 | 9.0 | 64,000 | — | Opaque |
| 24. | Tartaric Acid/Glycerol Ester (1:2) | 13.2 | 25.2 | 10.3 | 64,300 | — | White |
| 25. | Propylene Glycol | 9.4 | 23.3 | 10.5 | 25 | 0.07 | Clear |
| 26. | Ethylene Glycol | 11.0 | 26.0 | 11.9 | 10 | 0.06 | Clear |
| 27. | No. 11/n-Butanol (1:1) | 7.5 | 17.2 | 8.9 | 40 | 0.02 | Clear |
| 28. | No. 11/n-Butanol (1:3) | 6.6 | 16.4 | 9.7 | 9 | 0.02 | Clear |
| 29. | n-Butanol | 5.7 | 15.8 | 10.7 | 2 | — | White |
| 30. | No. 12/Dimethoxyethylphthalate (1:1) | 11.5 | 10.5 | 6.7 | 260 | — | Opaque |
| 31. | Dimethoxyethylphthalate | 11.9 | 8.2 | 8.3 | 30 | — | White |
| 32. | Triethylene Glycol | 12.5 | 18.6 | 5.0 | 30 | 0.02 | Clear |
| 33. | Dipropylene Glycol | 20.3 | 18.4 | 5.1 | 40 | 0.02 | Clear |
| 34. | No. 33/Propylenecarbonate (1:3) | 18.8 | 8.5 | 7.5 | 2 | 0.02 | Clear |
| 35. | Glycerol | 12.1 | 29.3 | 14.6 | 540 | 0.24 | Opaque |
| 36. | No. 8/Propylenecarbonate/Dipropyleneglycol (2:1:1) | 16.4 | 16.0 | 0.7 | 750 | 0.10 | Clear |

The viscosity of the diluent at 30° C. ($\eta_{30}$) was determined on a Brookfield Model LVF viscometer according to the standard operating procedure for that instrument. The modulus of the resultant lens as given in Table III was determined on a microtensile test apparatus while the sample was immersed in normal saline solution according to the following procedure.

A lens test sample 3 mm wide and a full diameter long was cut from the hydrogel lens with a dual bladed instrument. The test sample was adhesively attached with cyanoacrylate adhesive to the ends of two aluminum pull strips spaced 10 mm apart.

The lens sample and aluminum pull strips were immersed in normal saline (0.9% NaCl buffered to pH of 7.2) and allowed to equilibrate. The thickness of the lens sample (t) was measured with an optical microscope to 1 micron. Two spots 1 to 2 mm apart were marked on the surface of the lens sample at a point approximately mid-way between the ends of the aluminum strips.

The test sample with attached aluminum strips was then placed in the microtensile test apparatus which allowed the lens sample to be elongated while suspended vertically and immersed in saline solution. The sample was held taut at zero load and the distance between the marks on the lens strip measured and noted as zero length ($l_o$). The lens sample was then elongated approximately 50%, and the load (m) and final length (l) between the marks on the lens measured after a 30 second delay. Young's Modulus E was then calculated according to the following equation:

$$E(\text{MPa}) = \frac{m \times 3 \times 9.81 \times 10^-}{t \times b \times (\lambda - \lambda^{-2})}$$

wherein
t = lens sample thickness
b = lens sample width
m = measured load at 50% elongation
$\lambda = l/l_o$ Referring now to Table IV, there are listed diluents numbered 22 to 36 which failed to yield hydrogel lenses of acceptable optical and/or physical properties. Many of the lenses were clear but had low strength as indicated by a modulus value E of 0.10 or less. Several of the other lenses were white or opaque indicating incompatibility between the diluent and the polymer. In all cases, the diluents of Table IV were rejected for use with the HEMA/MAA copolymer of the test.

The diluents indicated in Tables III and IV as esters of an acid or anhydride with a polyol are not pure esters, but are rather a reaction product containing the ester in combination with any excess of the reactants. The weight ratio of the individual reactants employed in the esterification reaction is provided in the parentheses following the indicated ester. Preferred compositions in this class of diluents comprise the reaction product of a di- or tricarboxylic acid or anhydride with a $C_3$ to $C_4$ alkane diol or triol, and mixtures thereof with glycerol triethylene glycol, propylene glycol and hexane-1,2,6-triol.

As a separate class of useful diluents, there are those compositions comprising mixtures of glycerol with a polyhydroxyl compound having at least two hydroxy groups and a Hansen cohesion parameter $\delta_h$ of less than 25, whereby the Hansen cohesion parameters $\delta_p, \delta_h$ of the mixture fall within Area A of FIG. 1. Illustrative of such diluents are mixtures of glycerol with hexane-1,2,6-triol, propylene glycol, triethylene glycol, or glycerol monoacetate, and mixtures thereof.

The data of Tables III and IV as plotted in FIG. I define an area A of generally acceptable diluents for casting optically clear hydrogel articles having good mechanical properties. This area is seen to be a function of diluent viscosity and R-value which in turn is a function of the Hansen cohesion parameters $(\delta_p, \delta_h)$ of the diluent relative to those of the polymeric component of the hydrogel.

One data point corresponding to Diluent No. 22 of Table IV is seen to be an unacceptable diluent falling squarely within Area A of FIG. I. It is noted that this diluent produced an optically clear lens but was rejected for poor mechanical properties, i.e., modulus of 0.09. While there is no sure explanation for this aberration in the data, it is possible that some unknown impurity in the lactic acid was responsible.

Area A is seen to lie broadly within the range where the R-value is 0 to 16 and viscosity is 100 to 500,000 m Pa sec. A particularly preferred range within Area A includes an R-value of from about 5 to 14, and viscosity of from about 1,000 to 100,000.

While the data of Tables III and IV were generated with a PHEMA polymer, or more specifically with the 98/2 HEMA/MAA polymer as described above, the test method is applicable to a number of hydrophilic polymer compositions. Thus, for example, polymers comprising HEMA, HEA, N-vinyl pyrrolidone, or other hydrophilic monomer alone or copolymerized with one or more other hydrophilic or hydrophobic monomers which are known to be useful in the preparation of shaped hydrogel articles such as soft contact lenses, may be polymerized in the presence of a diluent as described herein.

The amount of diluent admixed with the monomers prior to polymerization is selected on the basis of the final equilibrium water content of the hydrogel, and according to whether any expansion or shrinkage of the molded gel lens is desired during the exchange of water for diluent. Representative polymerization mixtures include:

A. 10 to 60% by volume of monomers comprising 90 to 99.8% hydroxyethyl methacrylate and 0.2 to 10% methacrylic acid, and 40 to 90% by volume of diluent, resulting in a hydrogel having a water content of 40 to 90%;

B. 30 to 60% by volume of monomers comprising 10 to 80% hydroxyethyl methacrylate and 20 to 90% N-vinyl pyrrolidone, and 40 to 90% by volume of diluent, resulting in a hydrogel having a water content of 40 to 70%;

C. 10 to 40% by volume of monomers comprising 90 to 95% hydroxyethyl acrylate and 5 to 20% vinyl acetate, and 60 to 90% by volume diluent, resulting in a hydrogel having a water content of 60 to 95%.

The present invention contemplates the desirability of casting shaped hydrogel articles from all hydrophilic polymer compositions, and provides a method whereby the diluents most likely to produce acceptable products with such polymeric compositions may be readily identified and characterized, thereby avoiding the time consuming, trial and error methods of the past. The present invention is accordingly not restricted to HEMA based polymers or to the specific examples presented herein, but extends to the improved method for preparing shaped hydrogel articles as set forth in the claims appended hereto.

We claim:

1. In the method of preparing shaped hydrogel articles by forming a polymerization mixture comprising one or more hydrophilic monomers, a cross-linking agent, and from about 20 to 95% by volume of a inert water displaceable diluent, polymerizing said mixture in substantially the desired configuration of the shaped hydrogel article to obtain a shaped gel of a hydrophilic polymer and said diluent, and thereafter replacing said diluent with water to obtain said shaped hydrogel article, the improvement comprising employing as said diluent an organic compound or mixture of compounds having a viscosity and R-value falling within Area A of FIG. I, said viscosity being from about 100 to 500,000 M Pa sec at 30° C., and said R-value being from 0 to about 16 as determined by the Hansen cohesion parameters for the diluent and the polymer according to the following equation $$R = [(\delta_{p1} - \delta_{p2})^2 + (\delta_{h1} - \delta_{h2})^2]^{0.5}$$

wherein $\delta_{p1}$, $\delta_{h1}$ respectively are Hansen polar and hydrogen bonding cohesion parameters for the polymer, and $\delta_{p2}$, $\delta_{h2}$, are the corresponding parameters of the diluent.

2. The method of claim 1 wherein the hydrophilic polymer comprises a major amount of at least one hydroxyacrylate monomer and a minor amount of one or more other hydrophilic or hydrophobic monomers copolymerizable therewith to yield a hydrophilic polymer.

3. The method of claim 2 wherein said hydroxyacrylate monomer is selected from the group consisting of hydroxyethylmethacrylate, hydroxyethylacrylate, hydroxypropylmethacrylate, hydroxypropylacrylate, and hydroxytrimethylene acrylate.

4. The method of claim 2 wherein said other copolymerizable monomers are selected from the group consisting of methyl methacrylate, methacrylic acid, acrylic acid, methoxytriethylene glycol methacrylate, 2-ethoxyethyl methacrylate, acrylamide, styrene, N-vinyl pyrrolidone, and vinyl acetate.

5. The method of claim 1 wherein the hydrophilic polymer comprises a major amount of an N-vinyl lactam monomer and a minor amount of one or more other hydrophilic or hydrophobic monomers copolymerizable therewith to yield a hydrophilic polymer.

6. The method of claim 5 wherein said N-vinyl lactam monomer is N-vinyl pyrrolidone.

7. The method of claim 5 wherein said other monomers copolymerizable with said N-vinyl lactam are selected from the group consisting of hydroxyacrylate monomers, methacrylic acid, acrylic acid, methyl methacrylate, styrene and acrylamide.

8. The method of claim 1 wherein the diluent comprises the ester reaction product of a di- or tricarboxylic acid or anhydride with a $C_3$ to $C_4$ alkane diol or triol.

9. The method of claim 8 wherein said diluent comprises an ester reaction product of an acid or anhydride and a polyol selected from the group consisting of succinic acid/glycerol, citric acid/propylene glycol, phthalic anhydride/glycerol, tartaric acid/propylene glycol, adipic acid/glycerol, phthalic anhydride/1,3- butane diol, and mixtures thereof with glycerol, triethylene glycol, propylene glycol, and hexane-1,2,6-triol.

10. The method of claim 1 wherein said diluent is a polyol selected from the group consisting of hexane-1,2,6triol and diglycerol.

11. The method of claim 1 wherein the diluent comprises a mixture of glycerol with a polyhydroxyl compound having at least two hydroxyl groups and a Hansen cohesion parameter $\delta_h$ of less than 25.

12. The method of claim 11 wherein said hydroxyl compound is selected from the group consisting of propylene glycol, triethylene glycol, hexane-1,2,6-triol, and glycerol monoacetate.

13. The method of claim 1 wherein said hydrogel article is a soft contact lens.

14. The method of claim 13 wherein said hydrogel article contains from 40 to 95% water.

15. The method of claim 14 wherein said soft contact lens is cast from a mixture of from about 10 to 60% by volume of monomers comprising 90 to 99.8% hydroxyethyl methacrylate and 0.2 to 10% methacrylic acid, and from about 40 to 90% by volume of diluent.

16. The method of claim 14 wherein said soft contact lens is cast from a mixture of from about 30 to 60% by volume of monomers comprising 10 to 80% hydroxyethyl methacrylate and 20 to 90% N-vinyl pyrrolidone, and from about 40 to 90% by volume of diluent.

17. The method of claim 14 wherein said soft contact lens is cast from a mixture of from about 10 to 40% by volume of monomers comprising 80 to 95% hydroxethylacrylate and 5 to 20% vinyl acetate, and from about 60 to 90% by volume of diluent.

18. The method of claim 1 wherein said mixture of hydrophilic monomers and water soluble diluent includes from 0.05 to 2 percent by weight of a cross-linking agent.

19. The method of claim 1 wherein said diluent is replaceable with water in a shaped hydrogel article having a minimum thickness of 1 mm or greater without forming crystalline compounds.

20. The method of claim 19 wherein said hydrophilic polymer comprises a major amount of at least one hydrophilic monomer selected from the group consisting of hydroxyacrylate monomers, N-vinyl lactam monomers, and mixtures thereof, and from zero up to a minor amount of at least one hydrophobic monomer copolymerizable therewith.

21. The method of claim 20 wherein said hydrophilic monomer is selected from the group consisting of hydroxyethyl methacrylate, hydroxyethyl acrylate, hydroxypropyl methacrylate, hydroxytrimethylene acrylate, N-vinyl pyrrolidone, and mixtures thereof.

22. The method of claim 20 wherein said hydrophobic monomer is selected from the group consisting of acrylic acid, methacrylic acid, methyl methacrylate, acrylamide, styrene, and vinyl acetate.

23. The method of claim 20 wherein said hydrogen article is a soft contact lens containing from 40 to 95% imbibed water.

* * * * *

UNITED STATES PATENT AND TRADEMARK OFFICE
CERTIFICATE OF CORRECTION

PATENT NO. : 4,680,336

DATED : July 14, 1987

INVENTOR(S) : Hans Ole Larsen, et al

It is certified that error appears in the above-identified patent and that said Letters Patent is hereby corrected as shown below:

Column 13, line 5, "1,2,6triol"
should be ---1,2,6-triol---

Column 14, line 27, "hydrogen"
should be ---hydrogel---

Signed and Sealed this

Twenty-fourth Day of November, 1987

Attest:

DONALD J. QUIGG

*Attesting Officer*  *Commissioner of Patents and Trademarks*